N. B. PECK.
GLASS BRACKETS
FOR
WARP CREELS.

116482

Patented Jun 27 1871

Witnesses.

Inventor.
N. B. Peek

UNITED STATES PATENT OFFICE.

NAPOLEON B. PECK, OF WOONSOCKET, RHODE ISLAND.

IMPROVEMENT IN BRACKETS FOR WARP-CREELS.

Specification forming part of Letters Patent No. 116,482, dated June 27, 1871.

*To all whom it may concern:*

Be it known that I, NAPOLEON B. PECK, of Woonsocket, in the county of Providence and State of Rhode Island, have invented a new and valuable Improvement in Brackets for Warper-Creels; and I do hereby declare that the following is a full, clear, and exact description of the construction and operation of the same, reference being had to the annexed drawing making a part of this specification, and to the letters and figures of reference marked thereon.

Figure 1:
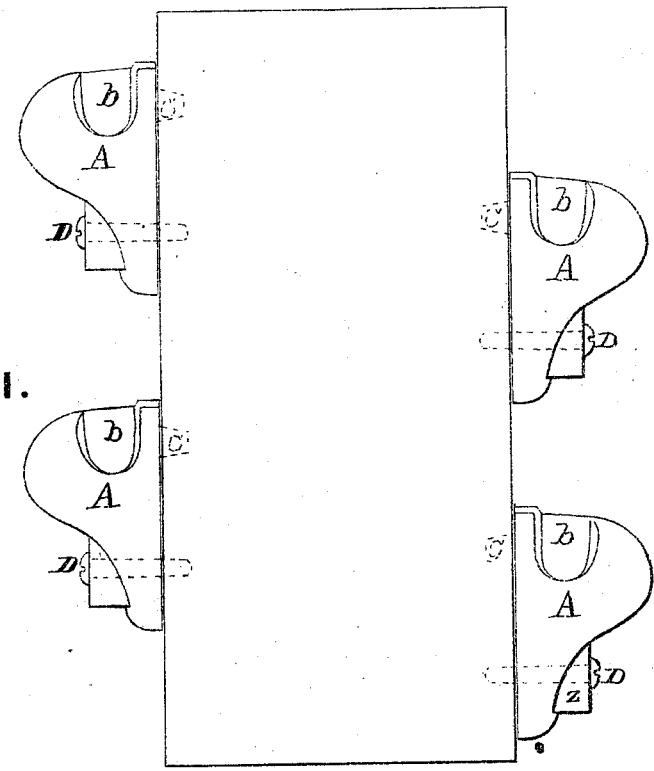
Figure 2:
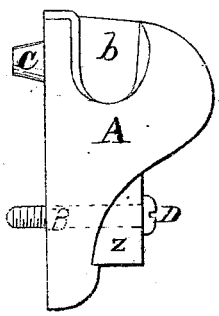

Figure 1 of the drawing is a representation of a warp-creel with four of my brackets attached. Figure 2 is a detached view, showing one of my glass brackets.

The object of this invention is to provide suitable brackets for warp-creels, with the object of rendering them more useful for the purpose intended.

Heretofore creel-stands for spools used in the manufacture of cotton have been made with the slotted bearings for the spools cut in the sides of the wooden supporting-frame. One of such stands holds upon the average three hundred spools, and the expense of cutting double this number of bearings is very great. The principal objection against such creel-stands is that the journals of the spools require to be frequently oiled, and the yarn is spoiled from carelessness in oiling. I obviate this difficulty by the use of brackets made of glass, which will cause little friction and require no oil, and will be independent of the creel-stand.

In the accompanying drawing illustrating this invention, A represents a bracket made of glass, secured to the edge of a creel-frame, as shown on the drawing. $b$ is a partition between the bearings in the center of the glass bracket, which is made in the usual form, or may be of any other preferred design. B represents the hole passing through the lower end of the bracket for the insertion of screw $d$, to attach the bracket to the edge of creel-frame. The bracket is strengthened at this point by forming a shoulder, $z$, and providing the same with a flat bearing-surface for the head of the screw. This unusual thickness is required on account of the brittle nature of the material of which the bracket is formed. C is a small lug, projecting from the face of the bracket, which is inserted into a corresponding hole in the creel-frame, and assists in holding firmly the bracket to its place, keeping it from moving laterally. This lug obviates the necessity of introducing a screw through the glass at this thin portion of the bracket, where it would be apt to cause fracture. The bearings of these brackets do not require any oil or other lubricator.

I am aware that it is not new to use glass as a lining for journal-seats; hence I do not claim such broadly; but

I claim as my invention—

A single-screw glass bracket for creels of warp-frames, provided with the stud C on the back of the journal-seat wall, and the buffer $z$ for strengthening the screw-hole, substantially as specified.

In testimony that I claim the above I have hereunto subscribed my name in the presence of two witnesses.

NAPOLEON B. PECK.

Witnesses:
WILLIAM E. MASON,
FRANCIS L. O'REILLY.